(12) United States Patent
Ho et al.

(10) Patent No.: US 9,093,917 B2
(45) Date of Patent: Jul. 28, 2015

(54) BRIDGELESS POWER FACTOR CORRECTION CIRCUIT

(71) Applicant: ABB Technology AG, Zürich (CH)

(72) Inventors: Ngai-Man Ho, Fislisbach (CH); Tin-Ho Li, Beijing (CN)

(73) Assignee: ABB TECHNOLOGY AG, Zurich (CH)

( * ) Notice: Subject to any disclaimer, the term of this patent is extended or adjusted under 35 U.S.C. 154(b) by 0 days.

(21) Appl. No.: 14/560,511

(22) Filed: Dec. 4, 2014

(65) Prior Publication Data
US 2015/0162822 A1 Jun. 11, 2015

(30) Foreign Application Priority Data

Dec. 5, 2013 (EP) .................................. 13195824

(51) Int. Cl.
*H02M 5/42* (2006.01)
*H02M 7/04* (2006.01)
*H02M 7/68* (2006.01)
*H02M 1/42* (2007.01)

(52) U.S. Cl.
CPC ............ *H02M 1/4208* (2013.01); *Y02B 70/123* (2013.01)

(58) Field of Classification Search
CPC .................................................. Y02B 70/123
USPC .................................................. 363/127, 89
See application file for complete search history.

(56) References Cited

U.S. PATENT DOCUMENTS 3,187,156 A * 6/1965 Seulen et al. ................. 323/209
4,412,277 A 10/1983 Mitchell
5,072,156 A * 12/1991 Droho ........................... 315/232
5,844,791 A * 12/1998 Swamy ........................... 363/47
6,181,539 B1 1/2001 Maejima et al.
7,215,560 B2 5/2007 Soldano et al.
8,199,541 B2 6/2012 Yang
(Continued)

FOREIGN PATENT DOCUMENTS

CN 101931319 A 12/2010

OTHER PUBLICATIONS

Lee et al., "A new UPS topology employing a PFC boost rectifier cascaded high-frequency tri-port converter," IEEE Trans. Industrial Electron., vol. 46, No. 4, pp. 803-813, Aug. 1999.
(Continued)

*Primary Examiner* — Jue Zhang
(74) *Attorney, Agent, or Firm* — Buchanan Ingersoll & Rooney PC

(57) ABSTRACT

A bridgeless power factor correction circuit as disclosed can include first and second input inductors, a series connection of a first diode and a first controllable semiconductor switch, and a series connection of a second diode and a second controllable semiconductor switch, the series connections being connected in parallel between positive and negative output terminals of the power factor correction circuit. The power factor correction circuit can include a switching circuit adapted to connect a capacitor between the input terminal and the output terminal such that the capacitor is connected between the first input terminal and a potential of the output terminal when input voltage connectable to the input terminals is positive and the capacitor is connected between the second input terminal and a potential of the output terminal when the input voltage connectable to the input terminals is negative.

20 Claims, 11 Drawing Sheets

(56) References Cited

U.S. PATENT DOCUMENTS

| | | | |
|---|---|---|---|
| 8,289,737 | B2 | 10/2012 | Wildash |
| 2011/0096577 | A1 | 4/2011 | Yamada |
| 2012/0212982 | A1* | 8/2012 | Wei et al. .................. 363/37 |
| 2013/0016545 | A1 | 1/2013 | Xu et al. |
| 2013/0049709 | A1 | 2/2013 | Fu et al. |

OTHER PUBLICATIONS

Chai, "Development of a switched-reluctance motor drive with PFC front end," IEEE Trans. Energy Conversion., vol. 24, No. 1, pp. 30-42, Mar. 2009.

Azcondo et al., "Microcontroller power mode stabilized Power Factor Correction stage for high intensity discharge lamp electronic ballast," IEEE Trans. Power Electron., vol. 22, No. 3, pp. 845-853, May 2007.

Souza et al., "High power factor rectifier with reduced conduction and commutation losses," in IEEE, Jun. 1999. (5 Pages).

Jang, et al., "A bridgeless PFC boost rectifier with optimized magnetic utilization," IEEE Trans. Power Electron., vol. 24, No. 1, pp. 85-93, Jan. 2009.

Kong et al, "Common mode EMI noise suppression in bridgeless boost PFC converter", Applied Power Electronics Conference, APEC 2007—Twenty Second Annual IEEE, IEEE, PI, Feb. 1, 2007, XPO31085322, pp. 929-935.

European Search Report issued Apr. 16, 2014, by the European Patent Office in corresponding European Patent Application No. 13 19 5824. (2 pages).

* cited by examiner

BRIDGELESS POWER FACTOR CORRECTION CIRCUIT

RELATED APPLICATION

This application claims priority under 35 U.S.C. §119 to European Patent Application No. 13195824.1 filed in Europe on Dec. 5, 2013, the entire content of which is hereby incorporated by reference in its entirety.

FIELD

The present disclosure relates to a bridgeless power factor correction (PFC) circuit, such as a PFC circuit for transforming a single-phase alternating current (AC) voltage to a direct current (DC) voltage.

BACKGROUND INFORMATION

A power factor corrector or a power factor correction circuit (PFC) is a front-end power stage of a grid-connected power converter, such as a power supply, motor drive and electronic ballast [1] to [3]. It is used to meet international grid current standards, such as IEEE519 and IEC-61000-3-12. These standards are also applied to a single-phase grid network which can be used as an AC power source for low power industrial applications and household devices. Using a PFC in a system ensures a sinusoidal input current and a stable output DC voltage. It can also be foreseen that the PFC will be a very important device to ensure a good power quality in a more complex grid network.

In a known PFC, a diode bridge and a boost converter are used. The diode bridge rectifies the grid current and voltage. The boost converter shapes inductor current into rectified sinusoidal current. As a result, grid current is sinusoidal and in-phase of grid voltage. This converter is simple and low-cost, since only one active switch is in the circuit. Thus, it is popularly adopted by lighting applications. However, the drawback of the circuit is a high conduction loss for high power applications since there are three semiconductors in the current path, irrespective of whether the controlled switch is on or off. Moreover, a large high frequency filter is used due to a large peak-to-peak high frequency ripple current carrying on the gird current.

In order to solve the conduction loss issue of the known PFC, a bridgeless PFC is proposed in [4]. The PFC integrates a diode bridge and a boost converter into one power stage, including two switching arms. One switching arm shapes half line cycle grid current. Two grid inductors are always in series, irrespective of the switching state. The circuit gives a low conductional loss, since it has only two semiconductors in the current paths. However, it is more expensive because of the more active device and magnetic components. In addition, there is a grounding problem, or a common mode voltage or leakage current issue, when it is operating. In addition, a high frequency filter is still included.

Some modifications of bridgeless PFC circuits have been proposed to tackle the issue of leakage current. A bridgeless PFC with a series semiconductor switch is presented in [5]. The series switch is synchronized with a main switching for current shaping. Thus, grid terminals are electrically isolated during inductor current charging states. Then, a low leakage current can be generated. However, it involves one higher-rated voltage, higher-rated current and higher switching frequency semiconductor switch in the main current flowing path. As a result, the conduction loss is higher than the simple bridgeless PFC during inductor current discharging states.

The fundamental idea of the bridgeless PFC is distorted and it is expensive. In addition, a high frequency filter is still included.

Another method of eliminating the common mode voltage issue is to use a bi-directional switch to charge up an input inductor current [6]. When the bi-directional switch is closed, all diodes are off due to a reverse bias by the output dc voltage. This leads to electrical isolation during that switching stage. There are thus always two semiconductors in the current paths. However, as the diode bridge is switching at a high frequency, four expensive fast diodes are used. The conduction performance of a fast diode is often not as good as that of line frequency diodes. A floating gate drive is another cost issue for this topology. In addition, a high frequency filter is still included.

A diode clamped bridgeless PFC is proposed in [7]. It provides a simple and efficient solution for tackling the common mode voltage issue. In this bridgeless PFC, two diodes connect the circuit ground to a positive terminal and a negative terminal of the AC power source, respectively. These two line frequency diodes guarantee that no common mode voltage difference occurs between the ground and the AC source. However, grid inductors work in half line cycle only, which means that two separate and identical inductors are used. The high cost and large size of the inductors are problematic. In addition, a high frequency filter is still included.

To address the use of expensive magnetic devices, a single core inductor is introduced in [8]. By this method, the size issue can be solved due to the use of one magnetic core. However, the design of the inductor is very difficult. In addition, a high frequency filter is still included.

Instead of diodes, capacitors can be used to maintain the voltage difference between the ground and the AC power sources. A capacitor clamped bridgeless PFC is disclosed in [9]. The capacitors are coupled to the grid terminals and the ground, whereby a low leakage current can be ensured, but a high frequency current ripple can still be found at the grid current; thus, a high frequency filter is still included.

A built-in common filter is disclosed in [10]. In this modification, a common mode filter connects serially with boost chokes, two capacitors perform functions of voltage clamping and filtering. The topology effectively reduces leakage current, but it does not help in filtering out the high frequency components from the grid current.

An improved capacitor clamped approach is proposed in [11]. In this design, two switches are used to connect the voltage clamped capacitors. According to the disclosure, the additional switches are switching at the same time and the switches are used to improve the efficiency during light load operation. Thus, it can be estimated that the performance should be more or less the same as that of a simple capacitor clamped bridgeless PFC.

The known solutions can effectively solve the common mode voltage issue of the bridgeless PFC, but the penalties include a higher conduction loss and more or larger passive devices. Moreover, not all solutions can improve the grid current quality.

SUMMARY

A bridgeless power factor correction circuit is disclosed, comprising: first and second input inductors (L), first ends of the inductors forming first and second input terminals of the circuit; a series connection of a first diode (D) and a first controllable semiconductor switch (S); a series connection of a second diode (D) and a second controllable semiconductor switch (S), the series connections being connected in parallel between positive and negative output terminals (VDC+, VDC−) of the power factor correction circuit; wherein: a second end of the first inductor (L) is connected at a point between the series connection of the first diode and the first controllable semiconductor switch; and a second end of the second inductor (L) is connected at a point between the series connection of the second diode and the second controllable semiconductor switch; wherein polarities of the first and second diodes (D) are such that current can pass through the diodes to the positive output terminal; and the controllable semiconductor switches (S) are arranged to block current from flowing through the controllable semiconductor switches to the negative output terminal, the power factor correction circuit comprising: a switching circuit configured to connect a capacitor (CAB; CA, CB) between the input terminals and the output terminals of the power factor correction circuit in such a manner that the capacitor is connected between the first input terminal and a potential of the output terminals when input voltage connectable to the input terminals is positive, and the capacitor is connected between the second input terminal and a potential of the output terminals when the input voltage connectable to the input terminals is negative.

BRIEF DESCRIPTION OF THE DRAWINGS

In the following, disclosed features and advantages will be described in greater detail by way of exemplary preferred embodiments, and with reference to the attached drawings, in which.

DETAILED DESCRIPTION

The present disclosure sets forth exemplary embodiments of circuits which can address the issues already raised.

Exemplary embodiments are based on the idea of using one or more capacitors and low frequency semiconductor switches in a bridgeless PFC circuit to formulate two different LCL filter structures for different conditions. For example, the semiconductor switches connect one or more capacitors to the circuit in an alternating manner, depending on the polarity of the input AC voltage.

This can reduce a grid differential mode current ripple or inductance. Further, the PFC common mode voltage can be significantly reduced, since the capacitor in the LCL filter clamps the voltage between the grid and the ground.

Exemplary circuits disclosed herein need not include large inductors since a third order filter is formed by using a switching circuit at the input of the circuit. The high frequency components are filtered out by the LCL filter and the filter structure is changed, depending on the polarity of grid voltage. Because the LCL filter attenuates high frequency components effectively, no separate EMI filter may be required.

Exemplary circuits disclosed therein can provide a low leakage current since the common mode voltage is clamped by the capacitors. Further, conduction losses are low because no active or passive elements are added to the main current path. Further, the input inductance being smaller, the number of turns in the inductors is also smaller. The use of low inductance inductors increases the efficiency.

Figure 1:
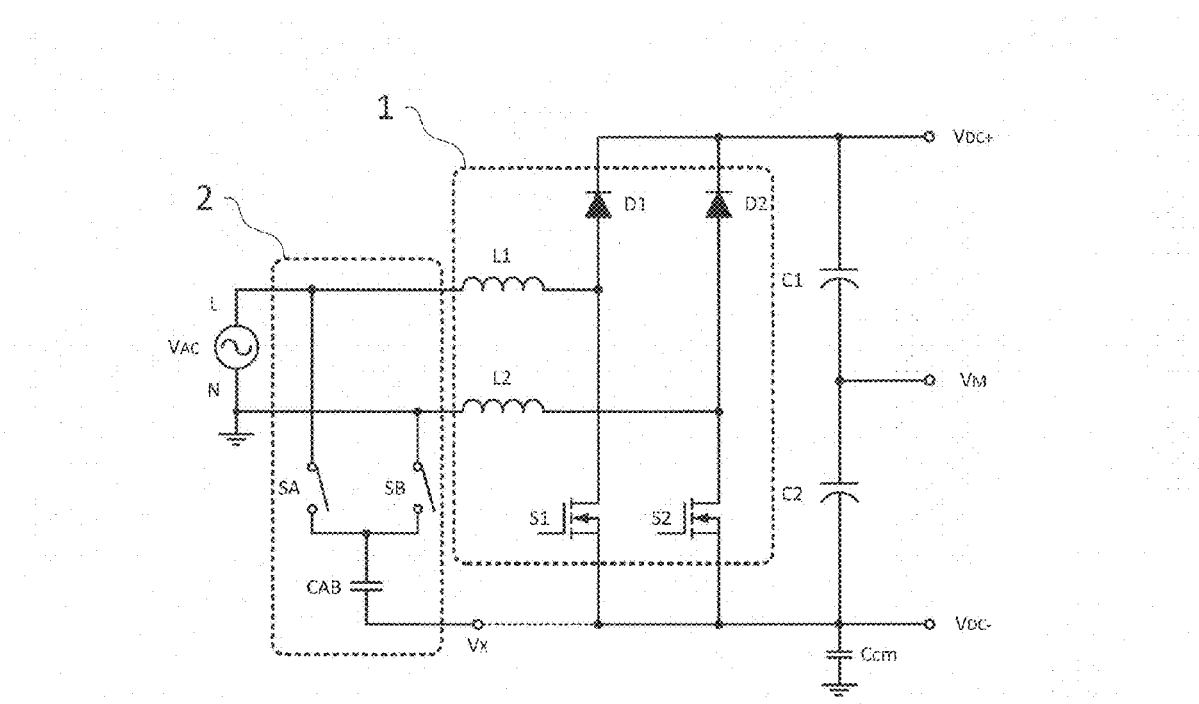
FIG. 1 shows an exemplary embodiment of the present disclosure.

FIG. 1 shows an exemplary embodiment disclosed therein. The exemplary PFC can include a known bridgeless PFC 1 and an additional switching circuit 2. The switching circuit can formulate two different LCL structures, depending on grid voltage polarity.

The bridgeless PFC 1 can include first and second input inductors L1, L2, first ends of the inductors forming first and second input terminals of the circuit. Further, the bridgeless PFC 1 can include a series connection of a first diode D1 and a first controllable semiconductor switch S1, and a series connection of a second diode D2 and a second controllable semiconductor switch S2. The series connections are connected in parallel between positive and negative output terminals VDC+, VDC− of the power factor correction circuit. The output terminals form the output voltage of the circuit and, for example, a capacitor or a series connection of capacitors C1, C2 is connected between the output terminals. As a series connection of capacitors is connected between the output terminals, a middle voltage potential VM is also available.

In the circuit of the exemplary embodiment, the second end of a first inductor L1 is connected at a point between the series connection of the first diode and the first controllable semiconductor switch, and similarly the second end of a second inductor L2 is connected at a point between the series connection of the second diode and the second controllable semiconductor switch.

Polarities of the first and second diode D1, D2 are such that current can pass through the diode to the positive output terminal. That is, cathodes of the diodes are connected to the positive output terminal VDC+. The controllable semiconductor switches S1, S2 are connected such that the switches can block current from flowing through the switches to the negative output terminal.

The bridgeless PFC circuit boosts the AC grid voltage to a higher DC bus voltage and controls the flow of DC power onto the DC bus. The grid current is controlled sinusoidally and in-phase to the AC grid voltage.

A switching circuit 2 filters out switching frequency components which are generated by the bridgeless PFC. The switching circuit can be adapted (i.e., configured) to connect a capacitor CAB; CA, CB between an input terminal and an output terminal of the power factor correction circuit in such a manner that the capacitor is connected between the first input terminal and a potential of an output terminal when an input voltage connectable to the input terminals is positive. The capacitor is connected between the second input terminal and a potential of an output terminal when the input voltage connectable to the input terminals is negative.

Specifically, in the exemplary embodiment of FIG. 1, the switching circuit can include two bi-directional switches SA, SB. The bidirectional switches are, for example, connected in series and one end of the series connection is connected to the first input terminal and the other end is connected to the second input terminal. In FIG. 1, the bridgeless PFC is shown to be connected to the input voltage VAC, whereby the first terminal is connected to Line L and the second terminal is connected to the neutral of the grid.

The switching circuit shown in FIG. 1 can also include a capacitor CAB that is coupled between the junction point of two bi-directional switches SA, SB and any potential of the output terminals, (i.e., any point of the output DC bus). In FIG. 1, one terminal of the capacitor Vx is shown coupled to the negative output terminal, (i.e., the potential of a negative DC bus. The capacitor is used to clamp the potential difference between the AC power source and the ground. The connection is shown in dashed line to highlight that the connection can also be to any other point of the DC bus, including a positive DC bus) (i.e., the positive output terminal, or the middle point of the output voltage VM.)

According to an exemplary embodiment, during a positive half wave of the input voltage, the switch SA is conducting and the switch SB is blocking. During a negative half wave the switch SB is conducting and the switch SA is blocking. Thus, during the positive half wave of the input voltage, the capacitor is connected to the input having the positive voltage. Similarly, during the negative half wave of the input voltage, the capacitor is connected to the input having the negative voltage.

Figure 2:
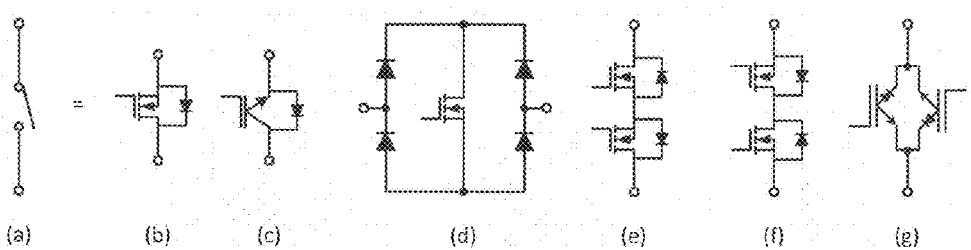
FIG. 2 shows exemplary implementations of bi-directional switches.

The bi-directional switches SA, SB can be realized by a single-directional blocking semiconductor switch or by connecting two MOSFETs back-to-back in series or other circuits and devices which can provide bidirectional blocking and conducting characteristics. In practice, a body diode of a MOSFET or an anti-parallel diode of an IGBT may create a leakage path when the semiconductor switches are turned off. FIG. 2 shows possible arrangements for the bi-directional switch SA, SB. Specifically, FIG. 2 (a) shows an ideal switch, (b) shows a MOSFET, (c) shows an IGBT with an anti-parallel diode, (d) shows a diode bridge with a controllable switch, (e) shows a common emitter back-to-back implementation, (f) shows a common drain back-to-back implementation, and (g) shows a bi-directional switch formed of anti-parallel reverse blocking IGBTs.

Figure 3:
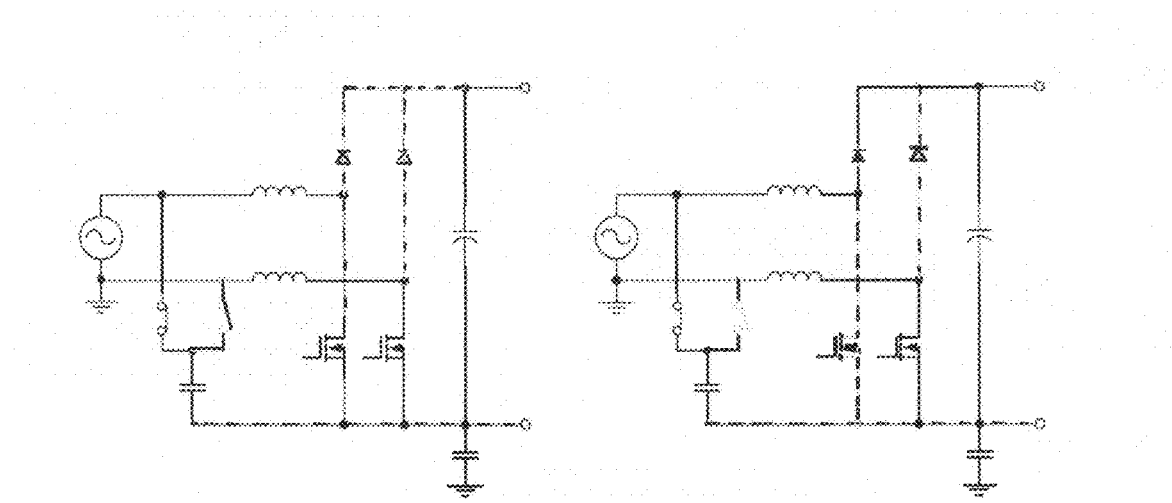
FIGS. 3 (a) and 3 (b) show switching states of an exemplary embodiment of the present disclosure during positive input voltage.

FIG. 3 shows exemplary switching states of the circuit of FIG. 1 during a positive half line cycle. In this half line cycle, the filter capacitor CAB is connected to Line L of the grid voltage through the bi-directional switch SA. The main switch S2 is always conducting and the main switch S1 is switching at a high frequency. When the switch S1 is conducting, the inductor L1 is charged, and when S1 is blocking, the inductor is boosting the output voltage.

Figure 4:
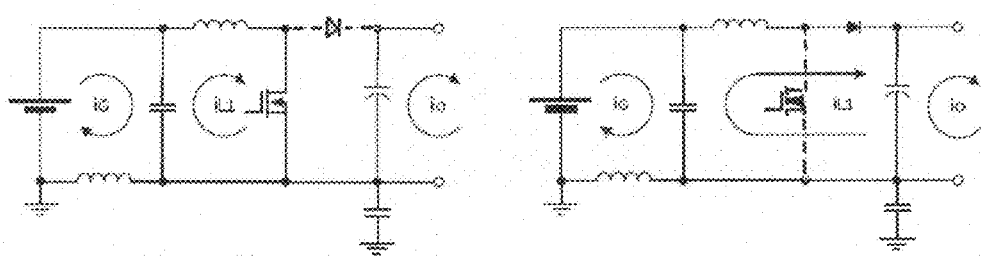
FIGS. 4 (a) and 4 (b) show exemplary equivalent circuits of FIGS. 3 (a) and 3 (b)

FIGS. 3(a) and 3(b) show the circuit when the main switch S1 is switching on and off, respectively. FIGS. 4(a) and 4(b) show corresponding equivalent circuits of FIGS. 3(a) and 3(b), respectively. It can be seen that L1, CAB, and L2 form an LCL filter between the grid and the boost converter. In such a case, L2 takes the role of a grid inductor, and thereby a low grid deferential current ripple is achieved. Further, the capacitor CAB is coupled between Line L and the negative terminal of the DC bus, and thereby the potential difference between them is clamped, and thus a low leakage current is achieved.

Figure 5:
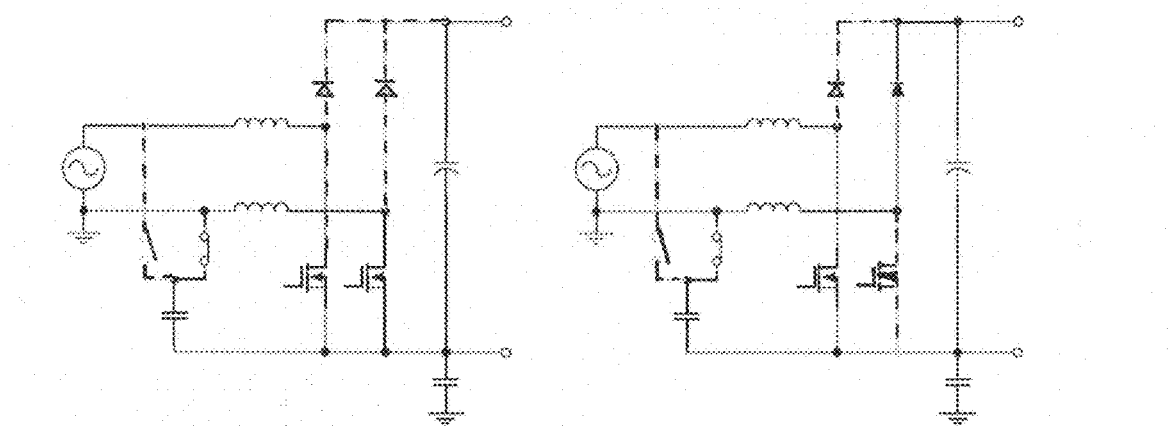
FIGS. 5 (a) and 5 (b) show switching states of an exemplary embodiment of the present disclosure during negative input voltage.
Figure 6:
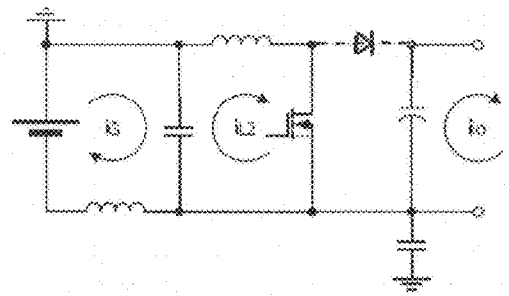
FIGS. 6 (a) and 6 (b) show exemplary equivalent circuits of FIGS. 5 (a) and 5 (b)
Figure 6:
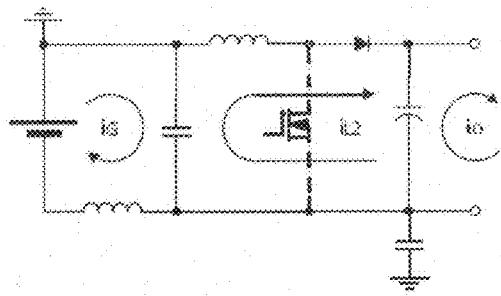

During the negative half line cycle of the input voltage, again two different switching states exist. In this half line cycle, the filter capacitor CAB is connected to Neutral N of the grid voltage through the bi-directional switch SB, the main switch S1 is always conducting and the main switch S2 is switching at a high frequency. FIGS. 5(a) and 5(b) show the circuit when the main switch S2 is switching on and off, respectively. FIGS. 6(a) and 6(b) are corresponding equivalent circuits of FIGS. 5(a) and 5(b), respectively. It can be seen that L2, CAB, and L1 form an LCL filter between the grid and the boost converter. In such a case, L1 takes the role of a grid inductor, and a low grid deferential current ripple is achieved. Further, the capacitor CAB is coupled between Neutral N and the negative terminal of the DC bus and the potential difference between them is clamped; therefore, a low leakage current is achieved.

Figure 7:
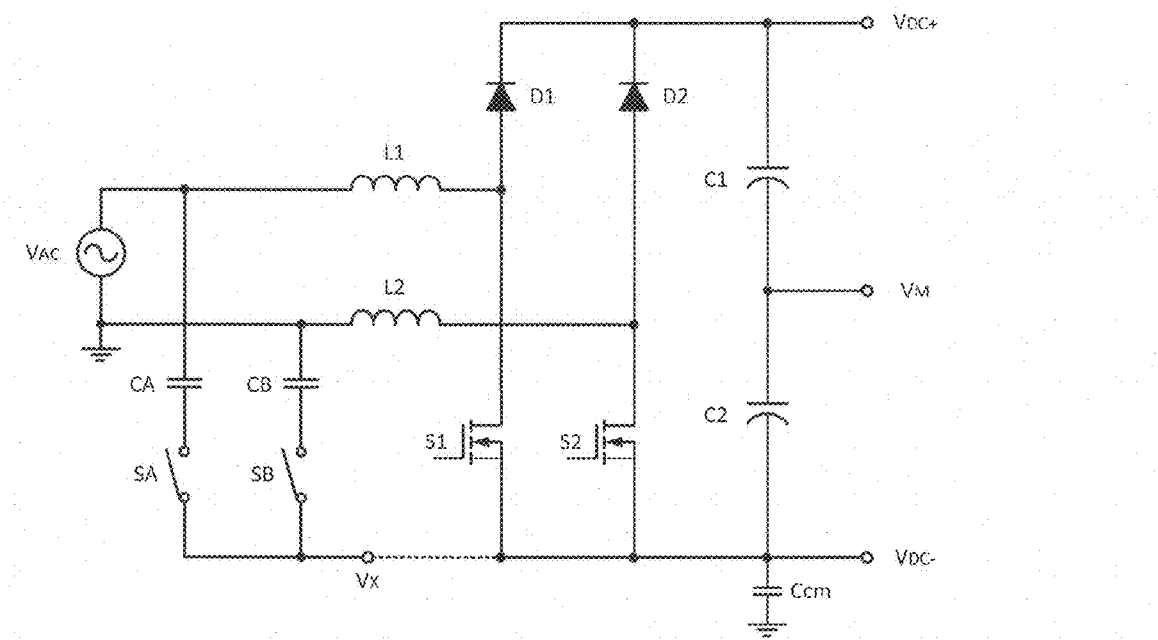
FIGS. 7, 8, 9, and 10 show exemplary embodiments of the disclosure.

FIG. 7 shows an exemplary embodiment. In this embodiment, separate switches SA, SB connect separate capacitors CA, CB to perform the functionality described above. Specifically, the switching circuit comprises two series connections of a switch and a capacitor. A first series connection SA, CA is connected between the first input terminal and a potential of an output terminal. Similarly, a second series connection SB, CB is connected between the second input terminal and a potential of an output terminal. In the example of FIG. 7, the other ends of the series connections are shown to be connected to negative output terminal. In the embodiment, SA switches are on in the period of the positive half line cycle, and SB switches are on in the period of the negative half line cycle. The purpose of the switches is to reconfigure the LCL filter, depending on the polarity of the input voltage. An advantage of the topology of FIG. 7 is that all semiconductor switches SA, SB, S1, and S2 are referenced to the ground, making it an attractive choice with respect to the design of gate drivers.

Figure 8:
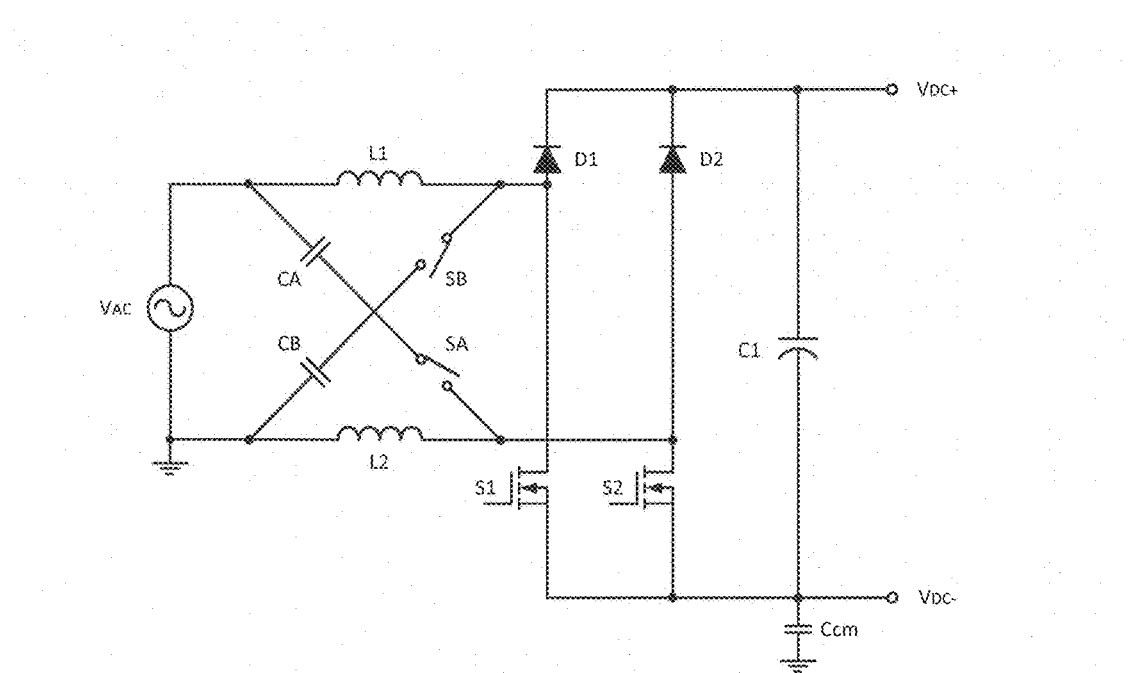

Another exemplary embodiment is shown in FIG. 8. The switching circuit in FIG. 8 is coupled in X shape between the arms consisting of a series connection of a diode and a controllable switch and the AC source. Two bi-directional switches and two capacitors are used in the circuit. More specifically, the first series connection of a switch SA and a capacitor CA is connected in series between the first end of the first inductor and the second end of the second inductor. The second series connection of a switch SB and a capacitor CB is connected between the second end of the first inductor and the first end of the second inductor.

Figure 9:
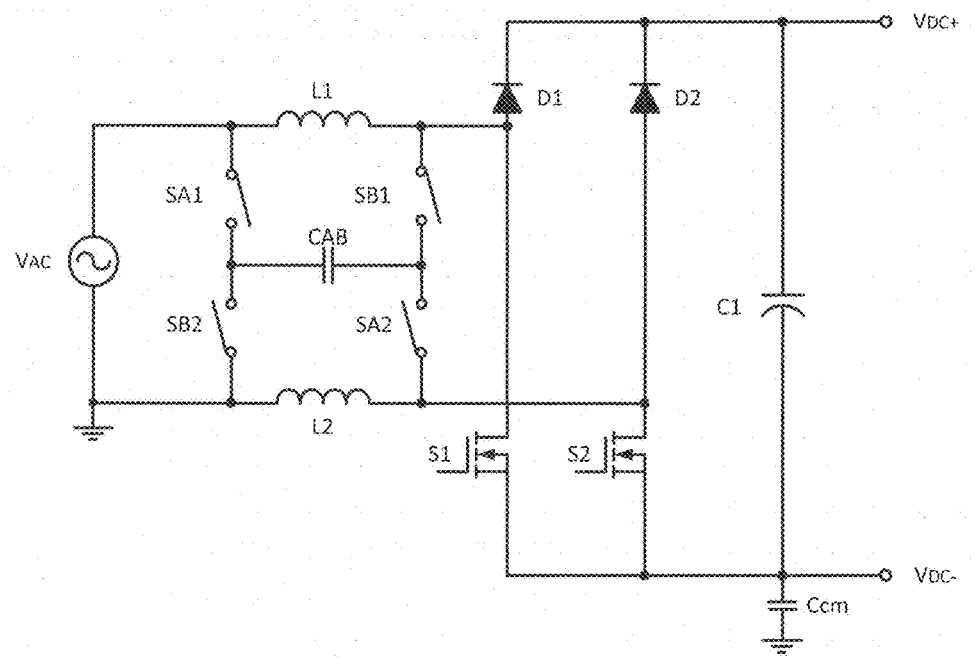

In the embodiment of FIG. 9, the additional switching circuit is coupled in H shape between the arms and the AC source. Only one capacitor is used in the circuit. The switching circuit of the embodiment comprises two series connections of controllable switches. The first of the series connections SA1, SB2 is connected between the first terminals of the inductors L1, L2, and the second of the series connections SB1, SA2 is connected between the second ends of the inductors. The capacitor CAB is connected between the middle points of the series connections. In the embodiment of FIG. 9, the capacitor CAB is connected to the circuit by using the switches SA1 and SA2 during a positive half cycle and the switches SB1 and SB2 during a negative half cycle.

In the embodiments of FIGS. 8 and 9, the capacitor is connected between the input terminal of the circuit and the potential of the output terminal through the main switches of the circuit. For example, in FIG. 8 during the positive half wave of the input voltage, the switch SA is conducting and the capacitor CA is connected between the first input terminal and the negative output terminal through the switch S2 which is conducting during the positive half wave. During the negative half wave, the capacitor CB is connected to the negative output terminal through the switch S1.

Figure 10:
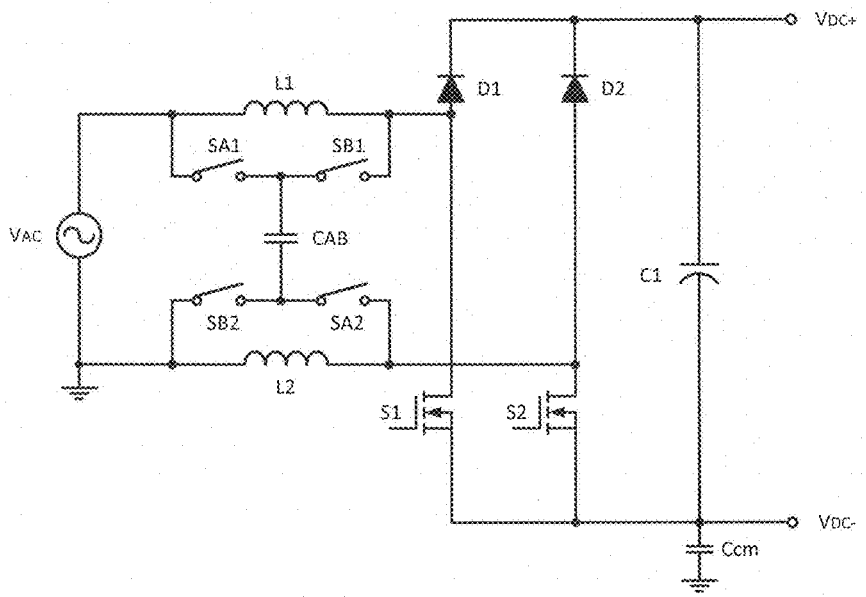

FIG. 10 shows another exemplary embodiment, in which the switching circuit is formed of four switches and one capacitor. The switches are arranged such that two series connections are formed and both of the series connections are connected over the inductances L1, L2 of the input. The capacitor CAB is connected between the middle points of the series connections of the switches. As in the embodiment of FIG. 9, the switches SA1, SA2 are controlled conductive during the positive half cycle of the input voltage, thereby connecting the capacitor between the first end of the first inductor and the second end of the second inductor. During the positive half cycle, the second end of the second inductor is connected to the potential of the negative output terminal through the conducting switch S2. During the negative half cycle, the switches SB1 and SB2 are controlled conductive, thereby connecting the capacitor CAB between the first end of the second inductor and the second end of the first inductor.

In the following, the performance of an exemplary bridgeless PFC disclosed herein is demonstrated by computer simulations. The simulated system corresponds to that of FIG. 1. The input source can include (e.g., consist of) a single-phase AC voltage source, and the output is a resistor. The simulated output power of the PFC is 2.2 kW, the output DC voltage is 380 V, the line frequency is 50 Hz, and the input AC voltage is 230 Vrms. The switching frequency is 20 kHz. All semiconductors and inductors are ideal components.

Figure 11:
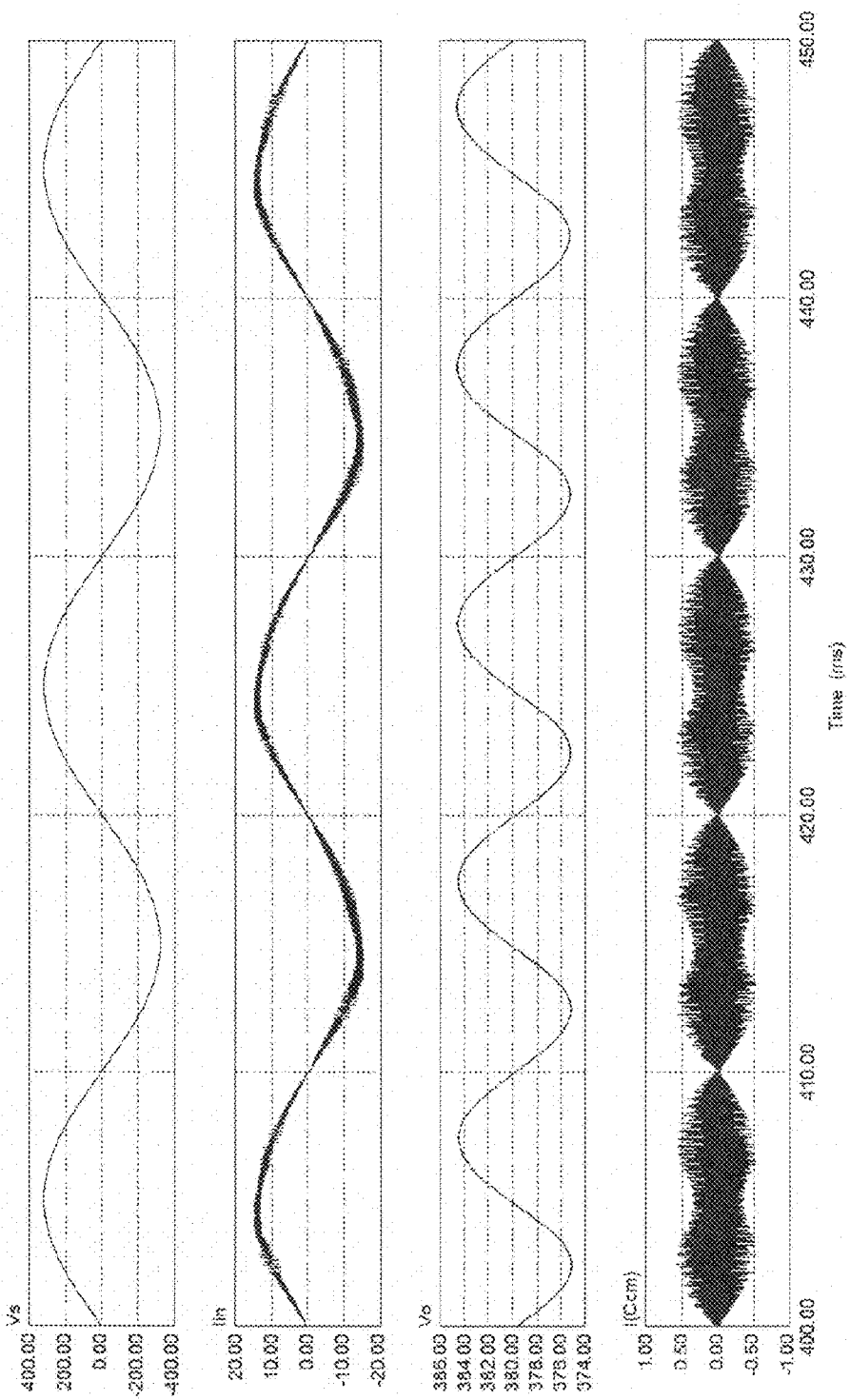
FIG. 11 shows exemplary simulated waveforms of the present disclosure.

FIG. 11 shows exemplary key simulated waveforms. It can be seen that the grid current (Iin, second plot) is shaped sinusoidal and in-phase to the grid voltage (first plot). Also, the current ripple is very small. The leakage current (I(Ccm), fourth plot) is small as well. The third plot shows the output voltage.

Figure 12:
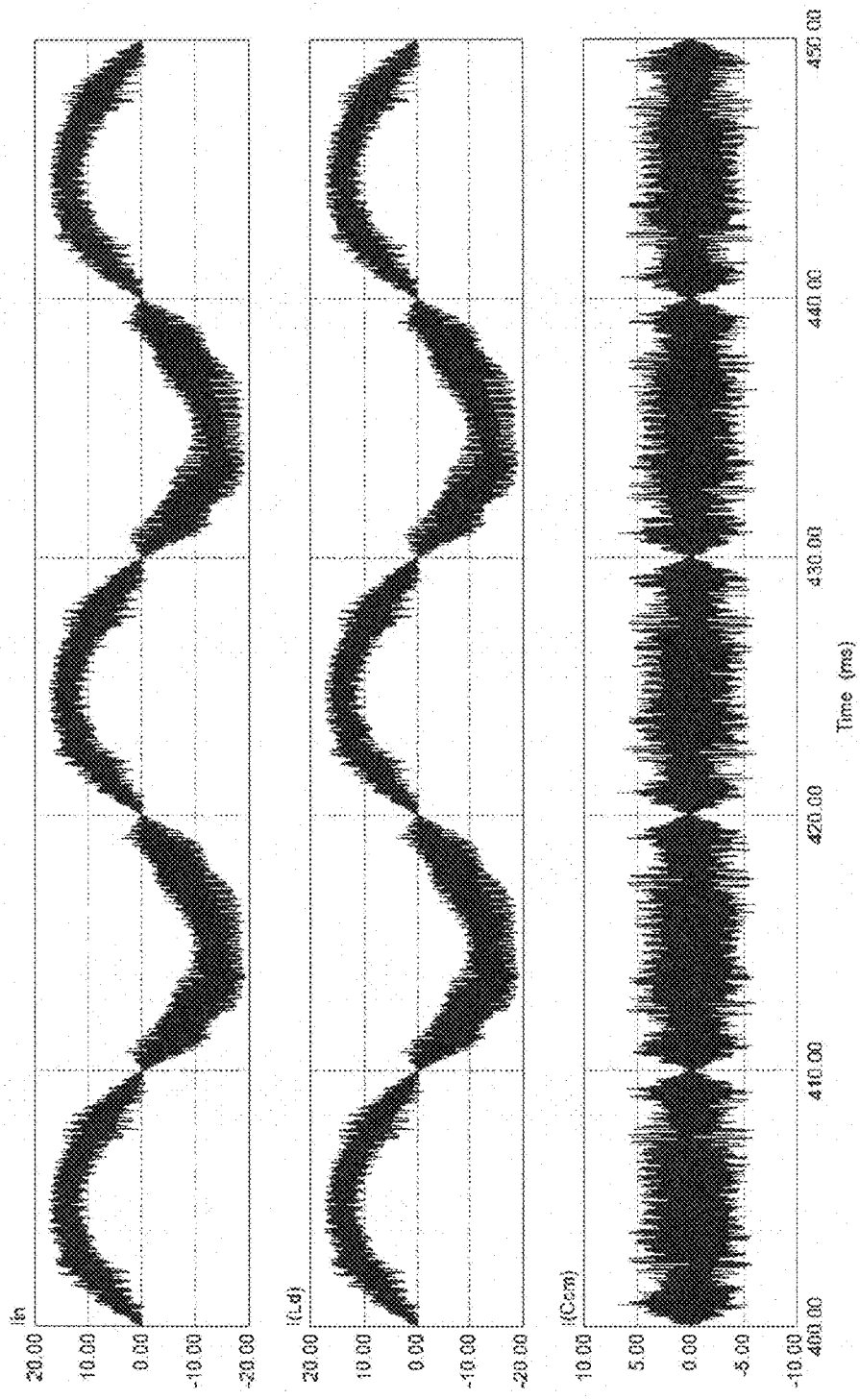
FIGS. 12 (a), (b), (c), (d), (e) show simulated waveforms of known devices as compared to the present disclosure.
Figure 12:
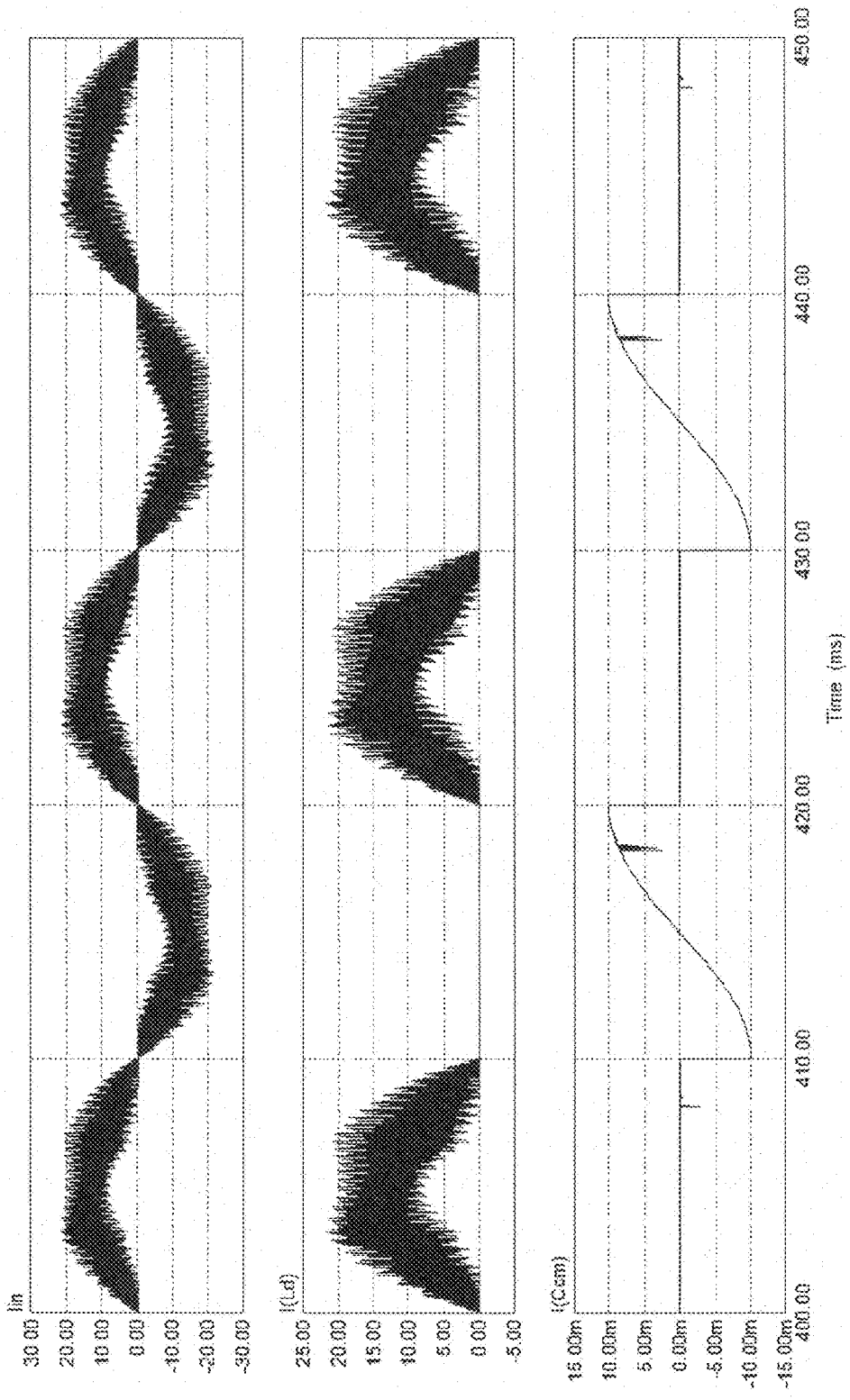
Figure 12:
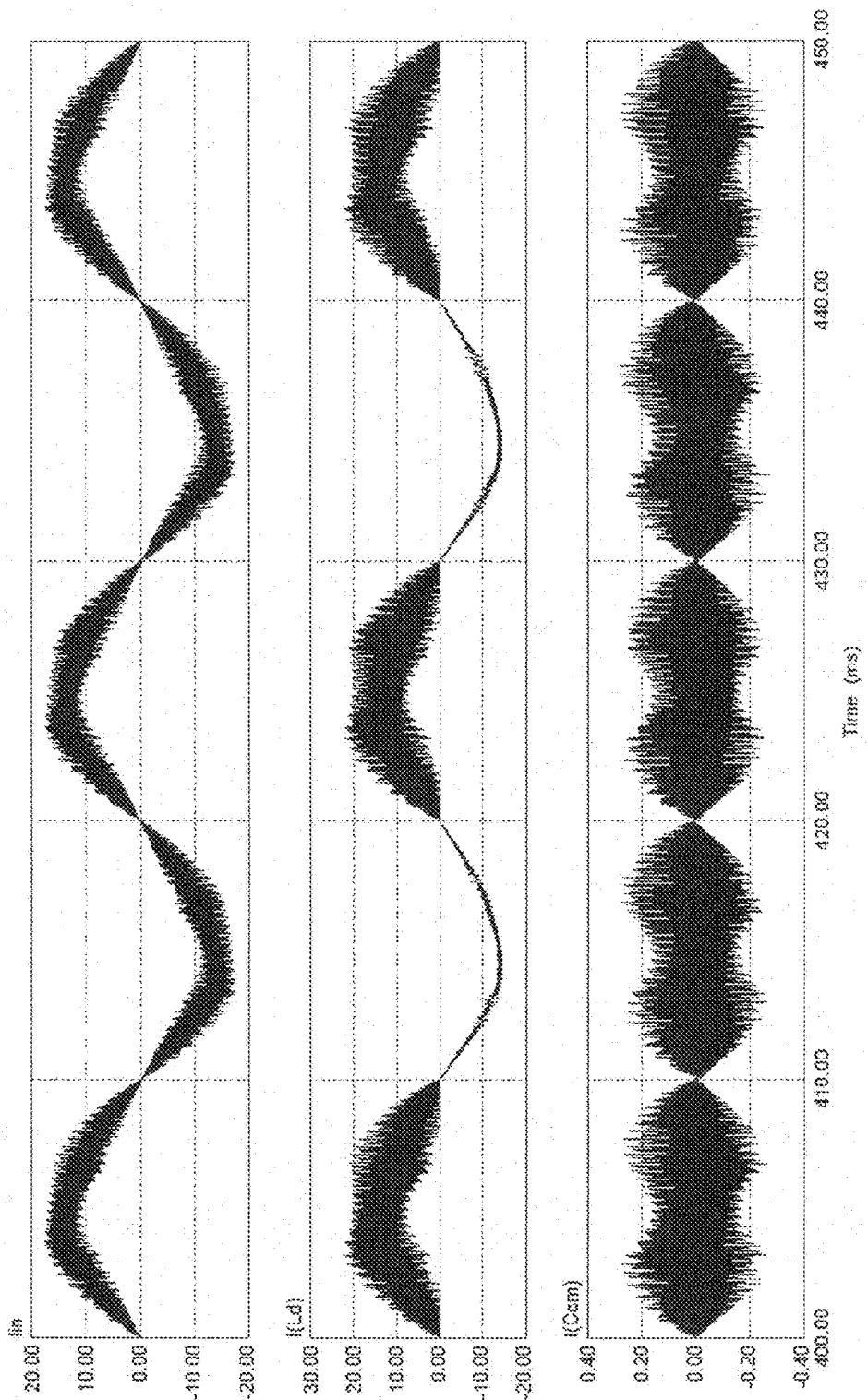
Figure 12:
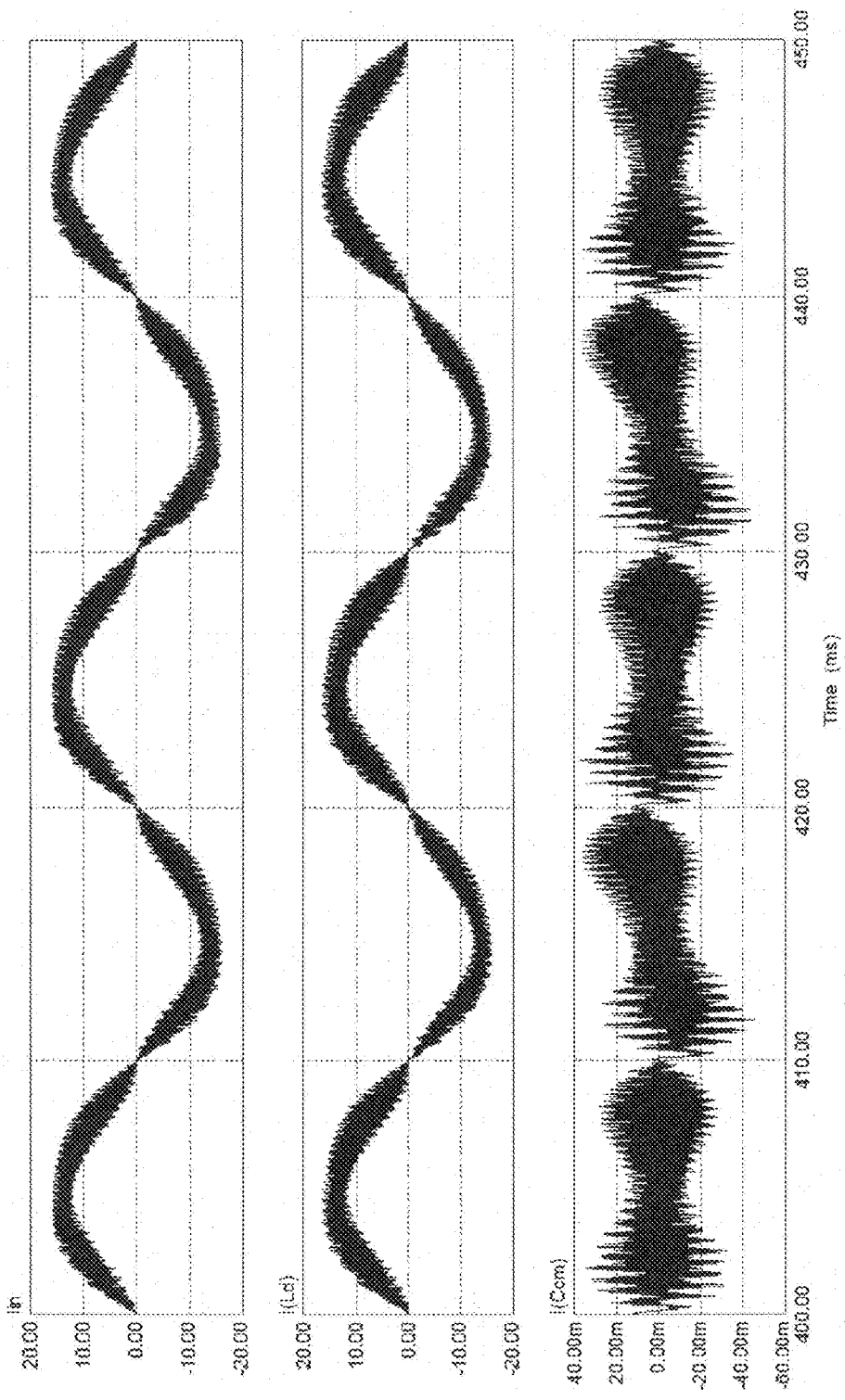
Figure 12:
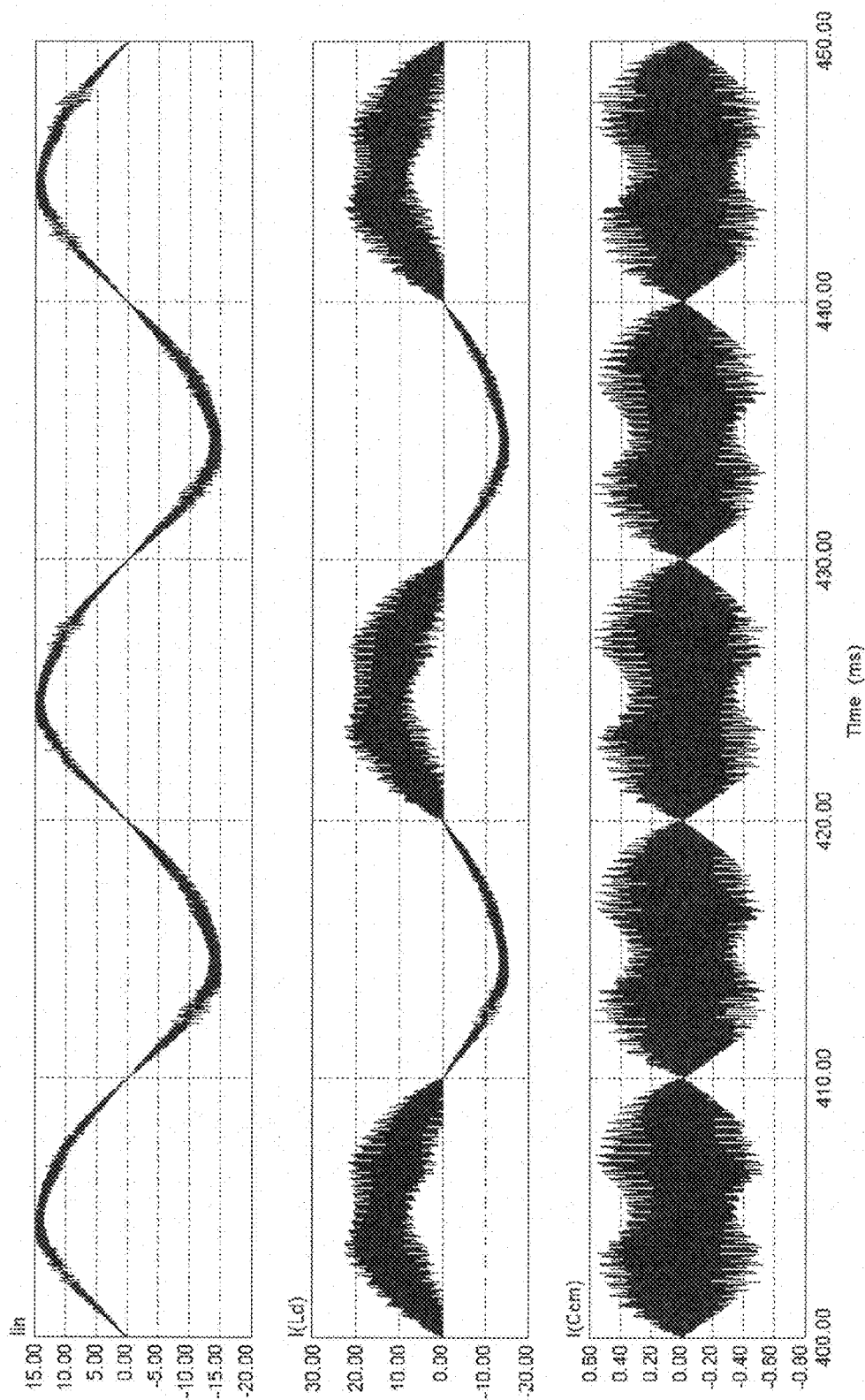

FIG. 12 shows a comparison of exemplary current waveforms using different clamping techniques in a bridgeless PFC. In the figures, the first row of waveforms is a grid current, the second row of waveforms is an inductor current, and the bottom row of waveforms is a leakage current. The inductance and switching frequency are the same in this comparison.

FIG. 12(a) shows waveforms of a known bridgeless PFC which is presented in [4]. The grid current (Iin) carries a large high frequency current ripple, and the leakage current is high as well (approximately 5A).

FIG. 12(b) shows diode clamped bridgeless PFC currents, the corresponding topology being presented in [7]. The leakage current is minimized, almost to 0 A, but the grid current ripple is higher than in the conventional one, since only one inductor is in the current path.

FIG. 12(c) shows capacitor clamped bridgeless PFC currents, the corresponding topology being presented in [9]. The leakage current is minimized to an acceptable range, 0.2A_peak, but the grid current ripple is still as high as in the known one.

FIG. 12(d) shows an exemplary capacitor clamped plus a common mode filter bridgeless PFC currents, the corresponding topology being presented in [10]. The leakage current is further minimized, to 0.02A_peak, but to no avail as far as the grid current ripple is concerned.

FIG. 12(e) shows exemplary waveforms of the bridgeless PFC of the present invention, the corresponding topology being presented in FIG. 1. The leakage current is slightly higher than in the prior art solutions but still in an acceptable range, (approximately 0.4A_peak); moreover, a high quality grid current is obtained. It can be seen that the PFC of the present disclosure can be superior to the known solutions in terms of high quality grid current and low leakage current.

Figure 13:
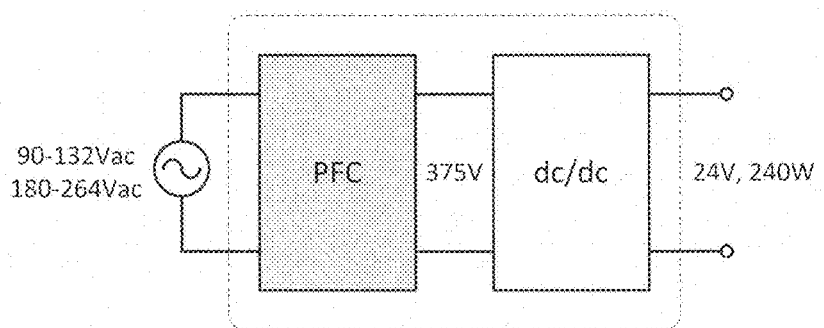
FIGS. 13 and 14 show basic block diagrams depicting examples involving exemplary embodiments of the present disclosure.
Figure 14:
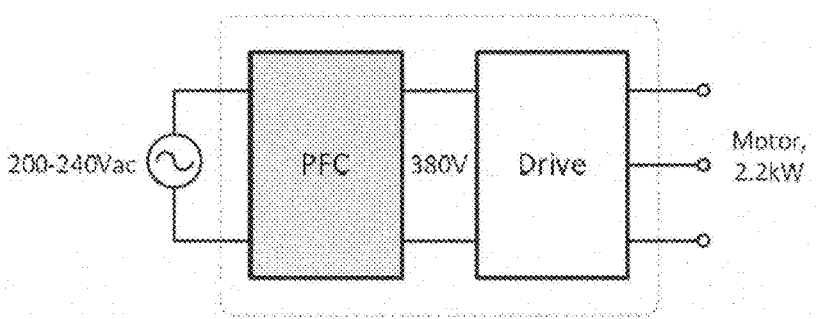

Exemplary embodiments can be usable in connection with an apparatus for sourcing AC power from an AC power grid to a DC load, such as a motor drive. FIG. 13 and FIG. 14 depict conceptual block diagrams of an exemplary two-stage power converter used to convert AC power from a single-phase grid into DC power suitable for driving an electrical load. The first stage of a power converter can include a Power Factor Corrector (PFC), such as a bridgeless PFC, that outputs DC power onto a DC bus. The second stage of the power converter can be an inverter (FIG. 14) or a DC-to-DC converter (FIG. 13) that supplies the power to a load. The voltage levels indicated in FIGS. 13 and 14 are examples of a commonly employed voltage.

It will be apparent to those skilled in the art that as technology advances, the inventive concepts disclosed herein can be implemented in various ways. The invention and its embodiments are not limited to the examples described herein but may vary within the scope of the claims.

Thus, it will be obvious to a person skilled in the art that the inventive concept can be implemented in various ways. The invention and its embodiments are not limited to the examples described above but may vary within the scope of the claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCES

[1] J.-Y. Lee, Y.-M. Chang, and F.-Y. Liu, "A new UPS topology employing a PFC boost rectifier cascaded high-frequency tri-port converter," IEEE Trans. Industrial Electron., vol. 46, no. 4, 803-813, August 1999.

[2] J.-Y. Chai, and C.-M. Liaw, "Development of a switched-reluctance motor Drive with PFC front end," IEEE Trans. Energy Conversion., vol. 24, no. 1, 30-42, March 2009.

[3] F. J. Azcondo, F. J. Diaz, C. Brañ as, and R. Casanueva, "Micro-controller power mode stabilized Power Factor Correction stage for high intensity discharge lamp electronic ballast," IEEE Trans. Power Electron., vol. 22, no. 3, 845-853, May 2007.

[4] 'AC-DC Converter having an improved power factor' US Patent Publication No. U.S. Pat. No. 4,412,277 A, Oct. 25, 1983.

[5] 'AC-to-DC conversion apparatus and related control manner thereof' US Patent Publication No. US 20130016545 A1, Jan. 17, 2013.

[6] 'Power conversion apparatus and air conditioner using the same' US Patent Publication No. U.S. Pat. No. 6,181,539 B1, Jan. 1, 2001.

[7] A. F. de Souza, and I. Barbi, "High power factor rectifier with reduced conduction and commutation losses," in Proc. Telecommunication Energy Conference, June 1999.

[8] Y. Jang, and M. Jovanovic, "A bridgeless PFC boost rectifier with optimized magnetic utilization," IEEE Trans. Power Electron., vol. 24, no. 1, 85-95, January 2009.

[9] 'EMI noise reduction circuit and method for bridgeless PFC circuit' US Patent Publication No. U.S. Pat. No. 7,215, 560 B2, Aug. 5, 2007.

[10] 'Bridgeless boost PFC circuits and systems with reduced common mode EMI' US Patent Publication No. U.S. Pat. No. 8,289,737 B2, Oct. 10, 2012.

[11] 'High efficiency bridgeless PFC power converter' US Patent Publication No. U.S. Pat. No. 8,199,541 B2, Dec. 6, 2012.

The invention claimed is:

1. A bridgeless power factor correction circuit, comprising:
   first and second input inductors (L), first ends of the inductors forming first and second input terminals of the circuit;
   a series connection of a first diode (D) and a first controllable semiconductor switch (S);
   a series connection of a second diode (D) and a second controllable semiconductor switch (S), the series connections being connected in parallel between positive and negative output terminals (VDC+, VDC−) of the power factor correction circuit; wherein:
   a second end of the first inductor (L) is connected at a point between the series connection of the first diode and the first controllable semiconductor switch; and
   a second end of the second inductor (L) is connected at a point between the series connection of the second diode and the second controllable semiconductor switch; wherein
   polarities of the first and second diodes (D) are such that current can pass through the diodes to the positive output terminal; and
   the controllable semiconductor switches (S) are arranged to block current from flowing through the controllable semiconductor switches to the negative output terminal, the power factor correction circuit comprising:
   a switching circuit configured to connect a capacitor (CAB; CA, CB) between the input terminals and the output terminals of the power factor correction circuit in such a manner that the capacitor is connected between the first input terminal and a potential of the output terminals when input voltage connectable to the input terminals is positive, and the capacitor is connected between the second input terminal and a potential of the output terminals when the input voltage connectable to the input terminals is negative.

2. A bridgeless power factor correction circuit as claimed in claim 1, wherein the switching circuit is arranged to form a conduction path for high-frequency current components from an input of the circuit through a capacitor to the potential of the output terminals.

3. A bridgeless power factor correction circuit as claimed in claim 1, wherein the switching circuit comprises:
   two controllable bidirectional switches (SA, SB) and a capacitor (CAB), the switches being connected in series between the first and second input terminals and the capacitor being connected between a connection point between the controllable switches and a potential of the output terminals.

4. A bridgeless power factor correction circuit as claimed in claim 1, wherein the switching circuit comprises:
   first and second controllable switches (SA, SB) and first and second capacitors (CA, CB), the first controllable switch and the first capacitor being connected in series between the first input terminal and a potential of the output terminals, and the second controllable switch and the second capacitor being connected in series between the second input terminal and a potential of the output terminals.

5. A bridgeless power factor correction circuit as claimed in claim 1, wherein the switching circuit comprises:
   first and second controllable switches (SA, SB) and first and second capacitors (CA, CB), the first controllable switch and the first capacitor being connected in series between the first input terminal and the second end of the second inductor (L), and the second controllable switch and the second capacitor being connected in series between the second input terminal and the second end of the first inductor (L).

6. A bridgeless power factor correction circuit as claimed in claim 1, wherein the switching circuit comprises:
   first and second controllable switch pairs (SA, SB), and a capacitor (CAB), the controllable switches of the switch pairs being connected such that a first switch (SA) of the first switch pair is connected in series with a second switch (SB) of the second switch pair and this series connection is connected between the first and second input terminals, and a first switch (SB) of the second switch pair is connected in series with a second switch (SA) of the first switch pair and this series connection is connected between the second ends of the first and second inductors, and the capacitor (CAB) is connected between connection points of the series connection of the controllable switches, wherein the first switch pair (SA) is arranged to be controlled conductive when the input voltage connectable to the input terminals is positive and the second switch pair (SB) is arranged to be controlled conductive when the input voltage connectable to the input terminals is negative.

7. A bridgeless power factor correction circuit as claimed in claim 1, wherein the switching circuit comprises:
   first and second controllable switch pairs (SA, SB) and a capacitor (CAB), the controllable switches of the switch pairs being connected such that a first switch (SA) of the first switch pair is connected in series with a first switch (SB) of the second switch pair and this series connection is connected between the first and second ends of the first inductor (L), and a second switch (SA) of the second switch pair is connected in series with a second switch (SB) of the second switch pair and this series connection is connected between the first and second ends of the second inductor (L), and the capacitor (CAB) is connected between the connection points of the series connection of the controllable switches, wherein the first switch pair (SA) is adapted to be controlled conductive when the input voltage connectable to the input terminals is positive and the second switch pair (SB) is adapted to be controlled conductive when the input voltage connectable to the input terminals is negative.

8. A bridgeless power factor correction circuit as claimed in claim 1, wherein a potential of the output terminals is the potential of a second output terminal, a first output terminal or a potential between voltages of the first output terminal and the second output terminal.

9. A bridgeless power factor correction circuit as claimed in claim 1, wherein the capacitor is connected between the input terminal and a potential of the output terminals through the first or second controllable semiconductor switch (S1, S2).

10. A bridgeless power factor correction circuit as claimed in claim 2, wherein the switching circuit comprises:
    two controllable bidirectional switches (SA, SB) and a capacitor (CAB), the switches being connected in series between the first and second input terminals and the capacitor being connected between a connection point between the controllable switches and a potential of the output terminals.

11. A bridgeless power factor correction circuit as claimed in claim 2, wherein the switching circuit comprises:
    first and second controllable switches (SA, SB) and first and second capacitors (CA, CB), the first controllable switch and the first capacitor being connected in series between the first input terminal and a potential of the output terminals, and the second controllable switch and the second capacitor being connected in series between the second input terminal and a potential of the output terminals.

12. A bridgeless power factor correction circuit as claimed in claim 2, wherein the switching circuit comprises:
first and second controllable switches (SA, SB) and first and second capacitors (CA, CB), the first controllable switch and the first capacitor being connected in series between the first input terminal and the second end of the second inductor (L), and the second controllable switch and the second capacitor being connected in series between the second input terminal and the second end of the first inductor (L).

13. A bridgeless power factor correction circuit as claimed in claim 2, wherein the switching circuit comprises:
first and second controllable switch pairs (SA, SB) and a capacitor (CAB), the controllable switches of the switch pairs being connected such that a first switch (SA) of the first switch pair is connected in series with a second switch (SB) of the second switch pair and this series connection is connected between the first and second input terminals, and a first switch (SB) of the second switch pair is connected in series with a second switch (SA) of the first switch pair and this series connection is connected between the second ends of the first and second inductors, and the capacitor (CAB) is connected between connection points of the series connection of the controllable switches, wherein the first switch pair (SA) is arranged to be controlled conductive when the input voltage connectable to the input terminals is positive and the second switch pair (SB), is arranged to be controlled conductive when the input voltage connectable to the input terminals is negative.

14. A bridgeless power factor correction circuit as claimed in claim 2, wherein the switching circuit comprises:
first and second controllable switch pairs (SA, SB) and a capacitor (CAB), the controllable switches of the switch pairs being connected such that a first switch (SA) of the first switch pair is connected in series with a first switch (SB) of the second switch pair and this series connection is connected between the first and second ends of the first inductor (L), and a second switch (SA) of the second switch pair is connected in series with a second switch (SB) of the second switch pair and this series connection is connected between the first and second ends of the second inductor (L), and the capacitor (CAB) is connected between the connection points of the series connection of the controllable switches, wherein the first switch pair (SA) is adapted to be controlled conductive when the input voltage connectable to the input terminals is positive and the second switch pair (SB) is adapted to be controlled conductive when the input voltage connectable to the input terminals is negative.

15. A bridgeless power factor correction circuit as claimed in claim 2, wherein a potential of the output terminals is the potential of a second output terminal, a first output terminal or a potential between voltages of the first output terminal and the second output terminal.

16. A bridgeless power factor correction circuit as claimed in claim 3, wherein a potential of the output terminals is the potential of a second output terminal, a first output terminal or a potential between voltages of the first output terminal and the second output terminal.

17. A bridgeless power factor correction circuit as claimed in claim 4, wherein a potential of the output terminals is the potential of a second output terminal, a first output terminal or a potential between voltages of the first output terminal and the second output terminal.

18. A bridgeless power factor correction circuit as claimed in claim 2, wherein the capacitor is connected between the input terminal and a potential of the output terminals through the first or second controllable semiconductor switch (S1, S2).

19. A bridgeless power factor correction circuit as claimed in claim 2, wherein the capacitor is connected between the input terminal and a potential of the output terminals through the first or second controllable semiconductor switch (S1, S2).

20. A bridgeless power factor correction circuit as claimed in claim 2, wherein the capacitor is connected between the input terminal and a potential of the output terminals through the first or second controllable semiconductor switch (S1, S2).

\* \* \* \* \*